UNITED STATES PATENT OFFICE.

DOULEE B. TURNER, OF CHICAGO, ILLINOIS.

COMPOSITION TO INSULATE, PRESERVE, AND PROTECT WIRE FOR ELECTRICAL PURPOSES.

SPECIFICATION forming part of Letters Patent No. 283,044, dated August 14, 1883.

Application filed July 9, 1883. (No specimens.)

*To all whom it may concern:*

Be it known that I, DOULEE B. TURNER, of the city of Chicago, county of Cook, in the State of Illinois, have invented a new and useful Compound called "Turner's Protective Insulator," which compound is fully described in the following specification.

This invention relates to that class of compounds used for the insulation of wires for all manner of electric conduction, and also for the preservation and protection of such wires against the action of extraneous substances, such as alkalies, acids, water, &c.; and it consists of a composition formed by mixing castor-oil or some other oil equivalent to it with a substance known by the different names of "Nubian pitch," "Nubian gum," and "colophony niger," which is a black resinous substance obtained as a residuum from the distillation of oils.

To prepare the said "Turner's Protective Insulator," take one part, by weight, of said oil to five parts, by weight, of said pitch. Place them together, cold, in a vessel and heat until the pitch is melted and the two substances may be readily mixed together; and when the said component parts are mixed together the compound is ready to be applied to the wire, and may be so applied, while hot, to the wire wrapped or wound with thread, or some other fibrous substance. The said pitch is a hard, brittle substance, and the admixture of castor-oil or some other oil equivalent to it with said pitch renders the compound flexible and pliable, and will maintain the flexibility and pliability thereof. The relative parts of said pitch and said oil to be used in making said compound may be varied according to the consistency, flexibility, and pliability desired for said compound.

This compound forms a perfect electric insulator for wires, and also resists the action of lime in every form, and all other alkalies, acids, water, and all extraneous substances that would tend to destroy such wires or to impair their usefulness.

The said compound in no manner impairs the strength or durability of the thread or material with which such wires may have been wound or wrapped previous to coating with the compound.

I claim—

1. A composition formed of castor-oil or some other oil equivalent to it, in combination with a substance known by the different names of "Nubian pitch," "Nubian gum," and "colophony niger," combined as above shown, to be used for the insulation of wires for all manner of electric conduction, substantially as above specified.

2. A composition made of the materials and in manner shown above, applied to wire that is wrapped or wound with thread or some other fibrous substance, for the purpose of insulated electric conduction, and also for the protection and preservation of such wires against the action of extraneous substances that would tend to destroy them or impair their usefulness, substantially as above specified.

DOULEE B. TURNER.

Witnesses:
CHARLES C. BATESON,
A. P. M. JEFFERS.